United States Patent Office 3,632,782
Patented Jan. 4, 1972

3,632,782
THYMOL AS AN ANTI-INFLUENZA AGENT
Harvey E. Alburn, West Chester, and George Greenspan, Merion, Pa., assignors to American Home Products Corporation, New York, N.Y.
No Drawing. Filed Jan. 13, 1967, Ser. No. 609,016
Int. Cl. A61k 27/00
U.S. Cl. 424—346                                          1 Claim

ABSTRACT OF THE DISCLOSURE

Method of treating influenza virus infections and preventing influenza virus attacks in warm-blooded animals by administering from 0.5 to 100 mg. per kilogram of body weight of thymol in a unit dosage form.

---

This invention relates to and has as its object the provision of new physiologically active compositions of matter. More particularly, this invention relates to the provision of new antiviral compositions, a novel method for preventing influenza virus attacks and in treating influenza virus infections in warm-blooded animals.

According to the present invention, natural and synthetic nonsteroidal terpenes are found to have anti-influenza activity against infections with various viruses in warm-blooded animals. The substituted and unsubstituted monoterpenes and sesquiterpenes having a 0 to 2 ring structure are particularly active.

The monoterpenes and sesquiterpenes may be cyclic, monocyclic or bicyclic hydrocarbons, alcohols, acids, esters, amines, aldehydes, ketones, lactones or sulfhydryls.

The terpene compounds that are useful in practicing the present invention include eugenol; isoeugenol; cyclamen aldehyde; myrcene; ocimene; alloocimene; citral; citronellal; citronellol; geraniol; nerol; linalool; menthane; menthone; p-menthan-3-one; 1-(p-menth-3-yloxy) acetic acid; menthol acetate; menthol, hydrogen succinate, alkali metal salt; p-menthane-1,8-diamine; menthol, p-menthane-2,9-dithiol; p-menthane-3-one, thiosemicarbazone; p-mentha-1,8-diene, p-mentha-1,5-diene, 1-p-mentha-6,8-diene-2-one; p-cymene; ionones; geronic acid; safrole; safranal; irene; irone; limonene; terpineol; terpinolene; terpinene; phellandrene; pinene; 2-pinane-thiol; 1,8-terpin; piperitol; isopulegol; carvone; carvomenthol; isopulegone; pulegone; encarvone; pinonic acid; cineole; ascaridole; thujene; sabinene; thujone; carene; carane; 2,3-epoxy-pinane; carvacrol; myrtenol; camphor; borneol; camphene; borny 1 chloride; fenchone; nor-bornane; 2-norbornanamine hydrochloride; 2-norbornanone; 5 - norbornene - 2,3 - dimethanol; anethole; 2,3-bornanediol; chrysanthemum-monocarboxylic acid, ethyl ester; β-caryophyllene; farnesol; abietic acid; dihydroabietylphthalate; abietic acid nitrile; dehydroabietic acid; abietic acid, methyl ester; dehydroabietylamine; coumarin; madecassol; nopol; isophorone; squalene; 1-perillaldehyde, α-anti-oxime; caryophyllene alcohol; thymol; nerolidol; bisabolene, lanceol; cadinine; eudesmol; cyperone; eremophilone; santonin; humulene; cedrol, and the like.

The compositions of this invention are useful in the topical treatment of influenza viral infections and may be administered perorally or parenterally to warm-blooded animals (e.g., mammals and fowl) in preventing influenza virus attacks and in treating influenza virus infections and related conditions inimical to the well being of the body. Administration can also be by spray or vapor through the mouth or nasal passages.

For preparing pharmaceutical compounds from the physiologically active compounds of this invention pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet disintegrating agents: it can also be an encapsulating material. In powders the carrier is a finely divided solid which is in admixture with the carrier having the necessary binding properties in suitable proportions and compacted in the shape and size desired. The powders and tablets preferably contain from 5 to 10 to 99% of the active ingredient. Suitable solid carriers are magnesium carbonate, magnesium stearate, talc, sugar, lactose, pectin, dextrin, starch, gelatin tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include ointments, solutions, salves, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation for oral or parenteral administration is in unit dosage form. In such form the preparation is sub-divided in unit doses containing appropriate quantities of the compound: the unit dosage form can be a packaged preparation, the package containing discret quantities of preparation for example, packeted powders of vials or ampules.

The unit dosage form can be a capsule, cachet or tablet itself or it can be the appropriate number of any of these in packaged form. The quantity of compound in a unit dose of preparation may be varied or adjusted from a 0.5 mg. to 100 mg. (generally within the range of 0.5 to 50 mg.) according to the particular application and the potency of the active ingredient. Sterile injectable solutions will ordinarily contain from about 0.5 to 25%, and preferably about 5 to 10% by weight of the active ingredient.

The dosage administered will be dependent upon the patient and the nature of treatment. Generally, a daily dosage of active ingredient will be from 0.5 mg. to 100 mg. per kilogram of body weight. Ordinarily, from 0.5 to 50 mg. preferably 0.5 to 20 mg. per kilogram per day, in one or more applications per day is effective to obtain the desired result.

The following experiments illustrate the antiviral activity of terpenes:

EXPERIMENT A (1) Anti-influenza testing in animals

Mice weighing 14–15 grams are infected with Influenza A virus. The influenza A virus was inoculated intranasally into the mice under light ether anaesthesia.

All the terpene compounds were administered in 0.5% carboxymethyl cellulose at a concentration of 1.0 mg./ml. The mice were injected with the terpene at 1.0 mg./mouse and 0.1 mg./mouse, starting at 24 hours before infection.

A single dose 24 hours after challenge with Influenza A is administered.

(2) Anti-influenza testing by tissue culture

To 5 ml. of rabbit kidney cells in a medium consisting of medium 199 (described in Proc. Soc. Experimental Biology and Medicine 73, pp. 1–8, January 1950) with phenyl red, 10% agamma calf serum, 100 units of penicillin, 100 units of streptomycin and 7.5% bicarbonate solution in a flask is added ½ ml. of terpene compound in a preparation formed by dissolving 12 mg. of terpene compound in 2 ml. of dimethyl sulfoxide and diluting twice with 10 ml. of medium 199 containing bicarbonate and 2% agamma calf serum without phenyl red. The flasks are incubated at 37% C. for 24 hours and then the medium containing the drug is decanted and discarded.

0.5 ml. of a virus solution containing about 50 plaque-forming units is added to each flask and incubated at 37° C. for 2 to 3 hours. 5 ml. of a first agar overlayer is added to each flask and incubated at 37° C. for 3–4 days. 5 ml. of a second agar overlayer is added and the flasks are incubated for 37° C. for 24 hours. The number of plaques are then counted.

The following example is illustrative, but by no means limitative of the preparations of this invention (all temperatures recorded being in centigrade).

An elixir of thymol is prepared by combining the following ingredients:

Thymol: 1.0 g.
Alcohol: 35.0 cc.
Polyethylene glycol: 35.0 cc.
Sodium cyclohexyl sulfamate: 1.25 g.
Sodium saccharin: 1.25 g.
Water q.s.: 100 cc.

In preparing the above composition, the alcohol and polyethylene glycol are mixed together, and the thymol is then added. The mixture is well stirred and the sodium cyclohexyl sulfamate and sodium saccharin are then added with continued stirring. Sufficient water is then added to bring the volume to 100 cc. Optional ingredients, such as flavoring, may then be added. The resulting elixir is then suitable for administration in the conventional manner, as for example, by teaspoon in about 5 cc. dosages.

Thymol may also be provided in a form suitable for oral administration by preparing an aqueous solution thereof; as for example, by dissolving sufficient thymol in a predetermined volume of water to provide a 3% solution. Obviously, solutions of varying concentrations of thymol can be similarly prepared.

What is claimed is:
1. A method for treating influenza infections in warm-blooded animals which comprises administering to an animal suffering from influenza from 0.5 to about 50 mg. daily per kilogram of body weight of thymol in a pharmaceutical unit dosage form.

References Cited

Nicolaides et al., J. of Med. Chem. 11, 74, (1968) pp. 74–79.

Andrewes, Viruses of Vertebrates, 1964, pp. 8–13.

Antibiotic News, vol. 5, No. 9, October 1968, pp. 1 and 3.

Andrewes, Viruses of Vetebrates, The Williams and Wilkins Co., 1964, pp. 199, 200 and 211–216.

Merck Index, Merck & Co., Inc., 7th Edition, 1960, p. 1045, Chemical Abstracts 64: 7252(b) (1966).

JEROME D. GOLDBERG, Primary Examiner

U.S. Cl. X.R.

424—278, 281, 304, 308, 316, 317, 331, 332, 333, 335, 340, 343, 356